United States Patent [19]
Turner et al.

[11] Patent Number: 5,251,381
[45] Date of Patent: Oct. 12, 1993

[54] PRECISION ANGULARITY HOLE CHECKER WITH INDICATOR

[75] Inventors: Glenn V. Turner, Newport Beach, Calif.; Omer D. Shearhart, Nowata, Okla.

[73] Assignee: Northrop Corporation, Hawthorne, Calif.

[21] Appl. No.: 777,968

[22] Filed: Oct. 17, 1991

[51] Int. Cl.$^5$ .............................. G01B 3/56; G01B 7/30
[52] U.S. Cl. ........................................ 33/538; 33/534; 33/542; 340/689
[58] Field of Search .................. 33/501.6, 534, 535, 33/538, 542, 533, 391, 390, 395; 340/689

[56] References Cited

U.S. PATENT DOCUMENTS

| | | | |
|---|---|---|---|
| 2,975,524 | 3/1961 | Field | 33/534 |
| 3,162,953 | 12/1964 | Porter | 33/535 |
| 4,138,824 | 2/1979 | Ponce de Leon | 33/390 |
| 4,219,936 | 9/1980 | Bridges | 33/534 |
| 4,319,403 | 3/1982 | Stearns | 340/689 |
| 4,328,621 | 5/1982 | Benjamin | 33/534 |
| 4,338,723 | 7/1982 | Benjamin | 33/535 |
| 4,486,954 | 12/1984 | Mock | 33/542 |
| 4,638,566 | 1/1987 | Thompson | 33/534 |
| 4,651,430 | 3/1987 | Vasku | 33/550 |
| 4,897,928 | 2/1990 | Maxville et al. | 33/534 |

Primary Examiner—Thomas B. Will
Attorney, Agent, or Firm—Terry J. Anderson; Robert B. Block; Karl J. Hoch, Jr.

[57] ABSTRACT

A device for the angularity of a hole has a housing, a pivotally movable probe, and a digital display for displaying angular deviation of the probe from a home position. The device can additionally or alternatively have a signaling device to signal angular deviation of the probe past a predetermined angular deviation.

19 Claims, 2 Drawing Sheets

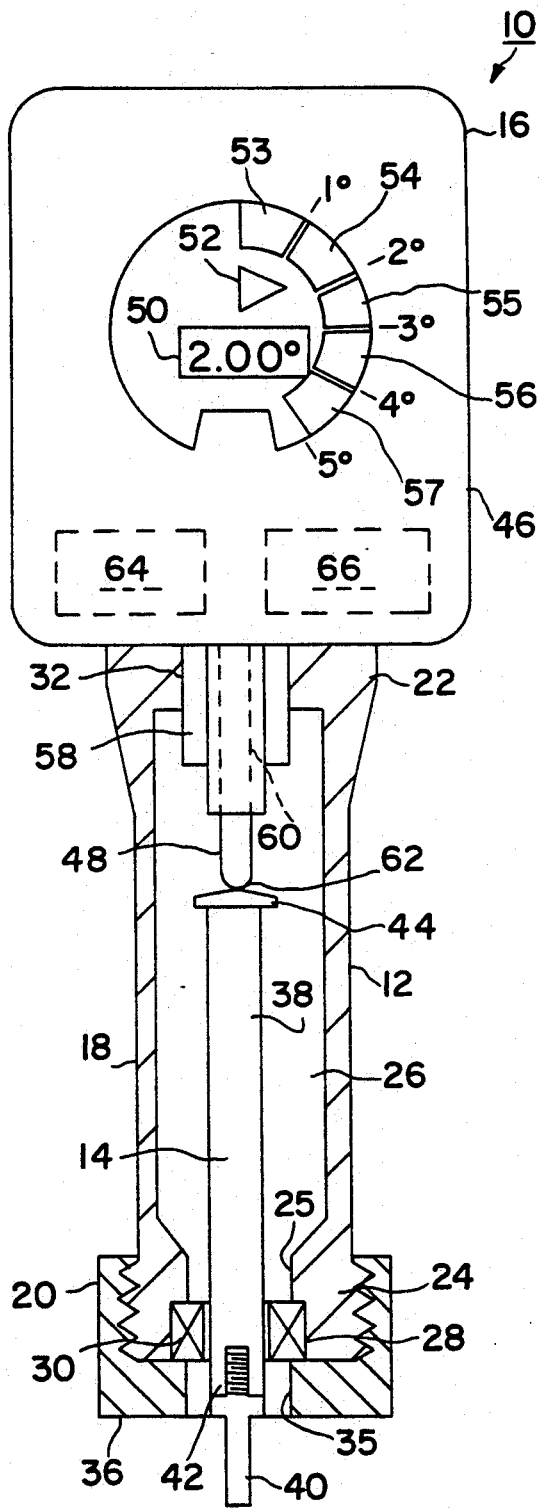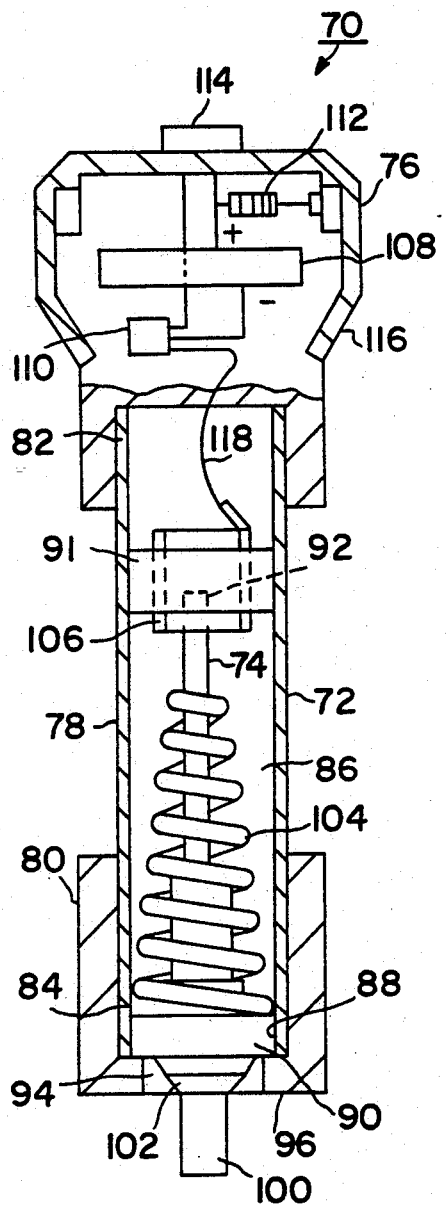
FIG.1
FIG.2

PRECISION ANGULARITY HOLE CHECKER WITH INDICATOR

BACKGROUND OF THE INVENTION 1. field of the Invention

The present invention relates to a hole angularity gauge and, more particularly, to a gauge that can electronically indicate angular deviation of a hole from a predetermined angularity.

2. Prior Art

Hole angularity measurement is a measurement in which one attempts to determine the perpendicularity of the center line of a hole or bore with respect to a plane that is parallel to the hole surface. The measurement bears particular importance for holes which are used in combination with screws and other similar fasteners as an indication of the resultant strength of the fastened structure. It is therefore desirable to provide a device for accurately measuring the angularity of a hole or bore.

In some industries, such as the aircraft industry, where mass production is impractical, many holes must be manually drilled. To improve quality control, a hole angularity measurement is taken on manually drilled holes to insure the integrity of the resultant structure. Accordingly, it is desirable to have a device for accurate manual measurement of the angularity of a drilled hole or bore.

It is therefore an objective of the present invention to overcome problems in the prior art and provide a new and improved angularity hole checker with indicator.

SUMMARY OF THE INVENTION

The foregoing problems are overcome and other advantages are provided by a new and improved precision angularity hole checker with indicator.

In accordance with one embodiment of the present invention, an apparatus for measuring the angularity of a hole in a member relative to a surface of the member that the hole projects into is provided comprising a housing, a probe, means for measuring angular movement of the probe relative to the housing, and means for displaying the relative angular movement. The housing has means for stably positioning the housing on the surface of the member being tested. The probe is pivotably connected to the housing and is adapted to be partially inserted into the hole being tested. The means for displaying includes an electrical digital display connected to the housing.

In accordance with another embodiment of the present invention, an angularity measuring device is provided for measuring the angularity of a hole relative to a home position. The device includes a housing, a probe, and means for signaling angular movement of the probe relative to the housing as the predetermined angular movement. The means for signaling includes a light emitting diode.

In accordance with another embodiment of the present invention, a device for measuring the angularity of a hole in a surface of the a member is provided having a housing, a probe, and means for measuring the angular movement of the probe relative to the housing. The probe is movably mounted to the housing and has a first end extending from the housing and a second end with a shaped surface. The means for measuring the angular movement of the probe to the housing has a rod movably connected to the housing and coaxial to the probe in a home position, the rod contacting the shaped surface of the probe second end such that the angular movement of the probe causes the shaped surface of the probe second end to move resulting in the rod longitudinally axially moving relative to the housing.

BRIEF DESCRIPTION OF THE DRAWINGS

The foregoing aspects and other features of the invention are explained in the following description, taken in connection with the accompanying drawings, wherein:

FIG. 1 is a schematic partial cross sectional view of a device incorporating features of the present invention.

FIG. 2 is a schematic cross sectional view of an alternate embodiment of the present invention.

DETAILED DESCRIPTION OF THE INVENTION

Figure 3:
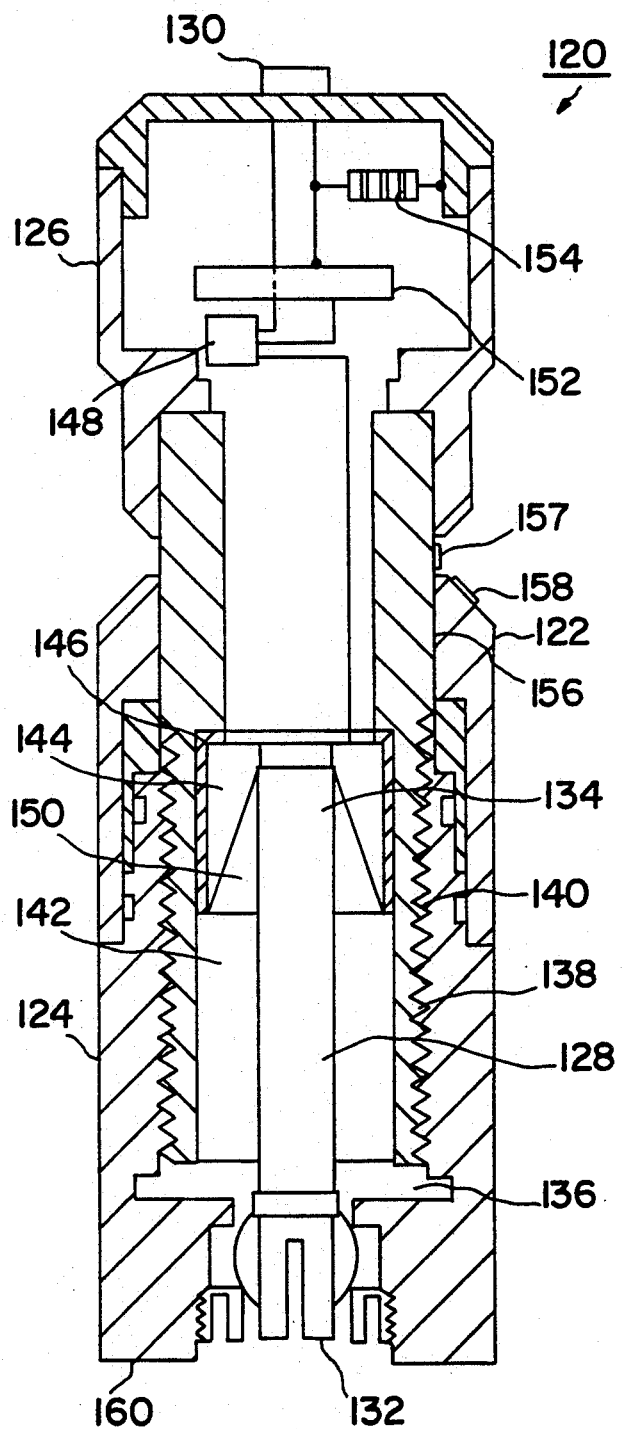
FIG. 3 is a schematic cross-sectional view of an alternate embodiment of the present invention.

Referring now to FIG. 1, there is shown a partial cross sectional front view of a hole anqularity gauge 10 incorporating features of the present invention. Although the present invention will be described with reference to the embodiments shown in the drawings, it should be understood that the present invention can be embodied in various different forms and with combinations of various different types of features. In addition, any suitable size, shape, or type of elements or materials can be used in various differently types of embodiments of the invention. The gauge 10, in the embodiment shown, generally comprises a housing 12, a probe 14, and an angularity indicator 16. The housing 12, in the embodiment shown, has a general column or tube shape with a first member 18 and a second surface contact member 20 connected to the first member 18. The first member 18 has the indicator 16 connected to its top end 22 and the surface contact member 20 connected to its bottom end 24. The first and second members 18 and 20 can be made of any suitable material such as metal or plastic. The first member 18 also has a channel 26 extending therethrough between the two ends 22 and 24. The second member 20 is provided as removably mounted to the first member 18 for ease of construction or such that it can be replaced. Located at the bottom end 24 is an aperture 25 into the channel 26 which has a bearing seat 28 for receiving and holding bearing 30. The top end 22 of the first member 18 also has an aperture 32 into the channel 26 which is adapted to receive a portion of the indicator 16 therein. The second member 20 is screwed onto the bottom end 24 of the first member 18 and has an aperture 35 that is aligned with the bottom end aperture 25. However, the first and second members 18 and 20 may be provided as a unitary structure. The bottom surface 36 of the second member 20 is intended to be positioned on the surface of a member being tested.

The probe 14, in the embodiment shown, is comprised of a probe body 38 and a probe tip 40. The probe tip 40 is removably mounted to the bottom end 42 of the probe body 38 such that it can be replaced by different sizes of probe tips. The probe tip 40 is selected by a user of the gauge 10 such that the tip 40 has substantially the same size as the hole being checked. Thus, the tip 40 can be positioned into a hole such that the center longitudinal axis of the tip 40 is coaxial with the center longitudinal axis of the hole being tested. The probe body 38 has a center longitudinal axis that is coaxial with the probe tip 40. The top end 44 of the probe body 38, in the embodiment shown, has a shaped surface that resembles a mound.

The bearing 30 is located in the bearing seat 28 and held in the bearing seat 28 by second member 20. The bearing 30 is adapted to connect the probe 14 to the housing 12. The connection provided by the bearing 30 prevents the probe 14 from longitudinally axially moving relative to the housing 12, but is adapted to allow limited pivotal movement of the probe 14 relative to the housing 12 about a 360° plane proximate the bearing 30. Thus, when the probe tip 40 is moved relative to its home position coaxial to the center longitudinal axis of the housing 12, the probe 14 is pivoted at the bearing 30 such that the top end 44 of the probe 14 is moved.

The indicator 16, in the embodiment shown, includes a housing 46, a longitudinally movable rod 48, an electrical digital display 50, and various light emitting diodes (LED) 52–57. The housing 46 can be made of any suitable material, such as metal or plastic, and has a collar 58 that is inserted into the top aperture 32 of the housing 12. The collar 58 and aperture 32 may be threaded to provide connection between the indicator 16 and housing 12. The collar 58 has a center channel 60 in which the rod 48 is movably positioned. The rod 48 has a bottom end 62 that is positioned against the top surface of the probe top end 44. In a preferred embodiment, the rod 48 is spring biased against the probe top end 44. The rod 48 extends into the housing 46 and is connected to a position sensor 64. Any suitable type of position sensor can be used including electrical or electromechanical. The position sensor 64 is connected to a computer 66, such as a microcircuit. The computer 66 is connected to a power supply (not shown), such as a battery in the housing 46, the digital display 50, and the light emitting diodes 52–57. The position sensor 64 can measure the position of the rod 48 and signal the computer 66 of the sensed position. The computer 66 can compare the sensed position to a home position of the rod 48 and, based upon this comparison, selectively signal or light the light emitting diodes 52–57 and transmit a signal to the digital display 50. The gauge 10 is generally configured such that angular deviation of the probe 14 from its home position coaxial with the rod 48 is translated by mechanical means to longitudinal movement of the rod 48. The longitudinal movement or position of the rod 48 is sensed by the sensor 64. The sensor 64, in turn, communicates the movement or position of the rod 48 to the computer 66. The computer 66, in turn, compares the sensor's signal to a predetermined value that corresponds to when the probe 14 is in its home position. The computer 66 then calculates the angular deviation of the probe 14 from its home position and sends a signal to the digital display 50 to display the calculated value of angular deviation. In a preferred embodiment this value is displayed in degrees, but can also be provided to display the value in radians or rads. In the embodiment shown, the gauge 10 can sense and display angular deviation up to 1/100 of a degree. Also in the embodiment shown, the computer 66 is programmed to light the first LED 52 if the angular deviation of the probe 14 exceeds a predetermined value, such as two degrees. The remaining five LEDs 53–57 are intended to be lighted to correspond to when angular deviation meets predetermined values. The housing 46 has indicia corresponding to these values. In the embodiment shown, the second LED 53 is lighted when the angular deviation exceeds one degree, the third LED 54 when the angular deviation exceeds two degrees, the fourth LED 55 when the angular deviation exceeds three degrees, the fifth LED 56 when the angular deviation exceeds four degrees, and the sixth LED 57 when the angular deviation exceeds five degrees. Of course, the gauge 10 could be provided without the digital display 50 or the LEDs 52–57. Any suitable type of signal could be provided to indicate angula deviation. In the embodiment shown, the mechanical means to translate the angular movement of the probe 14 into longitudinal movement of the rod 48 comprises the contact of the bottom end 62 of the rod 48 with the mound shaped top end 44 of the probe body 38. In the home position of the probe 14, the bottom end 62 of the rod 48 contacts the highest point of the mound 44. When the probe tip 40 is angularly moved, the top end 44 of the probe is moved such that the highest point of the mound is no longer under the bottom end 62 of the rod 48. The rod, in turn, is moved down, thus longitudinally moving. The mound is suitably shaped such that angular movement of the probe 14 is translated into longitudinal movement of the rod 48 about a 360° plane.

In order to use the gauge 10, a user will select the proper size probe tip 40 for the hole to be tested and connect the tip 40 to the probe body 38. The user then merely positions the probe 40 in the hole and positions the bottom surface 36 of the housing second member 20 against the surface of the member being tested. The housing 12 automatically assumes a position perpendicular to the surface of the member being tested and the probe 14 automatically assumes an angular position corresponding to the angular deviation of the hole relative to the surface and housing 12. This angular deviation is translated to the rod 48, sensor 64 and computer 66. The computer 66, in turn, calculates the angular deviation and uses the digital display 50 and LEDs 52–57 to signal the user of the angular deviation. Referring now to FIG. 2, a second embodiment of the invention is shown. In the embodiment shown, the gauge 70 has a housing 72, probe 74 and indicator 76. The housing has a first member 78 and a second member 80. The indicator 76 is connected to the top end 82 of the first member 78 and the second member 80 is connected to the bottom end 84. The first member 78 has a center channel 86 with a bearing 90 at a bottom aperture 88. The second member 80 is screwed onto the bottom end 88 of the first member 78 and has an aperture 94 that is aligned with the bottom aperture 88. The bottom surface 96 of the second member 80 is intended to be positioned o the surface of a member being tested.

The probe 74 is a unitary structure with a tip 100 that extends from the bottom of the gauge 70. In the embodiment shown, the tip 100 has a tapered section 102 for use with a hole that has a tapered section for a screw head. A coiled spring 104 is provided to bias the probe 74 in a home position. The gauge 70 has a contact sleeve 106 connected to the housing 72 by an insulator 91. The top end 92 of the probe 74 is located in the interior of the sleeve 106. With the probe 74 in a home position, the top end 92 of the probe is spaced from the interior wall of the contact sleeve 106.

The indicator 76 has a battery 108, a transistor 110, a resistor 112, a light emitting diode (LED) 114 and a housing 116. An electrical wire 118 connects the sleeve 106 to the transistor 110. The transistor 110 is also connected to the battery 108 and LED 114. The LED is also connected to the battery 108 and resistor 112. The resistor 112 is also connected to the housing 116. In the embodiment shown, the housing first member 78 and indicator housing 116 are comprised of electrically conductive material. The probe 74 is also comprised of electrically conductive material and is electrically connected to the housing first member 78. The gauge 70, in the embodiment shown, is generally intended to signal angular deviation of a hole past a predetermined value. When the probe tip 100 is located in a hole and bottom surface 96 is positioned against the surface of the member being tested, the probe 74 will pivot at bearing 90. The top end 92 of the probe 74 will move inside the sleeve 106. If the angular deviation of the hole exceed a predetermined value, the top end 92 will contact the sleeve 106, thus establishing an electrical circuit through the probe 74, sleeve 106 and wire 118 to the transistor 110 that will provide electricity to the LED 114. When the LED 114 is lighted, the user can thus be signaled that the angular deviation of the hole exceeds a predetermined value. If the angular deviation of the hole does not exceed the predetermined value, than the probe top end 92 will not contact the sleeve 106 and the LED 114 will not be lit. After use, the coiled spring 104 will return the probe 74 back to its home position.

Referring now also to FIG. 3, an alternate embodiment of the present invention is shown. In the embodiment shown, a gauge 120 generally comprises a housing 122 with a bottom section 124 and a top section 126, a probe body 128, and an LED 130. The probe body 128 is pivotally connected to the base of the housing bottom section 124 and has a first end 132 adapted to have a probe tip removably mounted thereon. Thus, the gauge 120 can use different types of probe tips to check different types or sizes of holes. The probe body 128 also comprises a second end 134. The housing bottom section 124, in the embodiment shown, is comprised of an electrically conductive material and has an interior channel 136 with a threaded section 138. The housing top section 126, in the embodiment shown, is also comprised of an electrically conductive material with a bottom threaded section 140 located, at least partially, inside the interior channel 136. In an alternate embodiment, the bottom section 124 may be partially located in an interior channel of the top section 126. The top section 126, in the embodiment shown, is thus movably connected to the bottom section 124 such that as the top section 126 is axially rotated relative to the bottom section 126, the top section 126 longitudinally axially moves relative to the bottom section 124. In the embodiment shown, the exterior side of the top section 126, at area 156, has markings or indicia 157, such as marks to indicate angles between 0°-5°. However, any suitable indicia can be provided. The thickness of indicia 157 is exaggerated in FIG. 3 for the sake of clarity. The indicia 157 may also be scribed into the top section 126. The top of the bottom section 124 also has a marker 158 such that when the LED 130 turns on, a user can read the appropriate indicia 157 aligned with the marker 158 to determine or read the angularity of the probe body 128 and, thus, the angularity of the hole its tip is located in. In an alternate embodiment, the marker 158 need not be provided such as when the user merely reads the lower most visible indicia 157 above the top of the bottom section 124. In a preferred embodiment, the side of the top section 126 is graduated from 0 degrees to 5 degrees with a graduation or indicia every ⅛ degree and, one full rotation of the top section 126 relative to the bottom section 124 will produce longitudinal movement of a ⅛ degree movement in indicia measurement. However, any suitable type of system could be provided. A further description of the angularity indication is provided below.

In the embodiment shown, the top section 126 has an interior channel 142 that the probe body second end 134 projects into, and an electrical contact 144 fixedly mounted in the channel 142. The electrical contact 144 is electrically isolated from the top section 126 by an insulator sleeve 146 and is electrically connected to a transistor 148. The contact 144, in the embodiment shown, has a cone shaped area 150 for the probe second end 134 to project into. Similar to the gauge 70 shown in FIG. 2, the gauge 120 also has a battery 152 and a resistor 154 which are connected to the LED 130, the transistor 148, and the housing top section 126. When the second end 134 of the probe 128 contacts the contact 144, the LED 130 is energized. When the second end 134 does not contact the contact 144, the LED 130 is not energized.

The gauge 120 shown in FIG. 3 is shown in a position with the marker 158 and indicia 157 indicating a 0° angularity of the probe body 128 relative to the housing bottom section 124. In this position the LED 130 would be lit because of contact between the probe body 128 and contact 144. The user, with the probe tip in the hole being checked and surface 160 against the surface of the member being checked, would turn the top section 126 counterclockwise relative to the bottom section 124 to move the top section 126 up relative to the bottom section 124. As the top section 126 moves up, the contact 144 also moves up. This results in the second end 134 of the probe body being given more room in the area 150 to move, thus allowing the housing 122 to move relative to the probe body 128 such that relative angularity can be established therebetween. Eventually, the surface 160 lies flat on the surface of the member being tested with the probe aligned with the axis of the hole being tested. Further rotation of the top section 126 results in the contact 144 being pulled away from the probe body 128 resulting in deactivation of the LED 130. This deactivation of the LED 130 signals the user that the housing and probe have reached their appropriate locations in order to read the indicia 157 which will then inform the user of the angularity of the probe relative to the housing, based upon the location of the top section 126 relative to the bottom section 124. Thus, the user knows the angularity of the hole being checked relative to the surface of the member that the hole is located in. Once completed, the user can then merely remove the gauge 120 to check the next hole and rotate the top section 126 either clockwise or counterclockwise, depending upon whether or not the LED 130 is energized when initially used with the next hole, to measure the next hole. Of course, any suitable type of relative motion system could be provided. In a preferred embodiment, an on/off switch is also provided.

Let it be understood that the foregoing description is only illustrative of the invention. Various alternatives and modifications can be devised by those skilled in the art without departing from the spirit of the invention. Accordingly, the present invention is intended to embrace all such alternatives, modifications and variances which fall within the scope of the appended claims.

What is claimed is:

1. An apparatus for measuring the angularity of a hole in a member relative to a surface of the member that the hole projects into, the apparatus comprising:

A housing having means for stabily positioning the housing on the surface of the member and a bearing mounted to the housing proximate the means for stabily positioning;

a probe pivotally connected to the housing at the bearing, whereby a longitudinal axial movement of the probe relative to the housing is precluded, and whereby further a pivotal movement of the probe relative to the housing about a 360° plane proximate the bearing is provided, the probe having a probe tip adapted for being partially inserted into the hole and further having mound-shaped surface at a top end of the probe opposite from the probe tip;

an indicator connected to the housing and including
a longitudinally movable rod having a bottom end positioned against the mound-shaped surface of the probe, whereby the pivotal movement of the probe relative to the housing is translated into a longitudinal movement of the rod.

means for measuring the longitudinal movement of the rod, means for determining an angular deviation of the probe in accordance with the measured longitudinal movement of the rod; and means for displaying the determined angular deviation, the means for displaying including an electrical digital display connected to the housing.

2. An apparatus as in claim 1 wherein the probe tip is removably mounted to the probe body.

3. An apparatus as in claim 1 wherein the means for displaying is adapted to digitally display the determined angular deviation in degrees.

4. An apparatus as in claim 3 wherein the means for displaying is also adapted to signal an incremental angular deviation exceeding a predetermined limit of deviation.

5. An angularity measuring device for signaling an angular deviation of a hole relative to a home positioned in excess of a predetermined value, the device comprising:

a housing having a bottom surface adapted for being positioned on a surface of a member in which the hole is formed;

a probe pivotally connected to the housing, the probe comprising
a tip adapted for insertion into the hole,
means for biasing the probe in the home position, and
a top end;

an annular contact sleeve connected in insulated contact to the housing, the top end of the probe in the home positioned being positioned within the contact sleeve and spaced from an interior wall of the contact sleeve; and means for signaling an angular movement of the probe relative to the housing in excess of a predetermined angular movement, the top end of the probe contacting the interior wall of the contact sleeve upon the angular movement of the probe exceeding the predetermined angular movement, the means for signaling including a light emitting diode.

6. A device as in claim 5 wherein the probe has a tapered tip section for use with a screw hole having a tapered hole section for receiving a screw head.

7. A device as in claim 5 wherein the means for biasing the probe in the home position comprises a coiled spring.

8. A device as in claim 5 wherein the means for signaling comprises:
a battery connected to the light emitting diode; and,
means connected to the light emitting diode, the battery, and the connecting sleeve for completing an electrical circuit between the battery and the light emitting diode upon contact between the top end of the probe and the interior wall of the contact sleeve.

9. A device as in claim 5 wherein the probe is pivotally connected to the housing at a bearing.

10. A device for measuring the angularity of a hole in a surface of a member, the device comprising:
a housing;
a probe movably mounted to the housing and having a first and extending from the housing and a second end with a mound shaped surface;
means for measuring an angular movement of the probe relative to the housing, the means for measuring having a longitudinally axially movable rod movably connected to the housing and coaxial to the probe in a home position, the rod contacting the mound shaped surface of the probe second end, whereby the angular movement of the probe is translated into a longitudinal axial movement of the rod relative to the housing.

11. A device as in claim 10 further comprising means for digitally displaying an angular deviation of the measured angular movement of the probe from the home position.

12. A device as in claim 10, further comprising means for signaling an incremental angular deviation of the measured angular movement of the probe in excess of a predetermined limit of deviation.

13. A device as in claim 10 wherein the probe has a removable probe tip at the first end.

14. An apparatus for measuring the angularity of a hole in a member relative to a surface of the member that the hole projects into, the apparatus comprising:
a housing having a first section and a second section, the first section having means for positioning the first section on the surface of the member, the second section being movably mounted on the first section;
a probe pivotally connected to the housing first section and adapted to be partially inserted into the hole; and
indicia formed on at least one of the housing sections, the indicia being adapted to be read by a user based upon a position of the housing sections relative to each other.

15. An apparatus as in claim 14 wherein the housing second section is axially longitudinally movable on the housing first section.

16. An apparatus as in claim 14 wherein the housing second section is axially rotatable on the housing second section.

17. An apparatus as in claim 14 further comprising means for signaling a predetermined position of the housing second section relative to the probe.

18. An apparatus as in claim 17 wherein the means for signaling comprises a light that is activated upon a portion of the probe contacting a portion of a contact in the housing second section.

19. An apparatus as in claim 18 wherein the contact has a general cone shaped area for an end of the probe to project into.

* * * * *